J. BERNARD.
AERIAL NAVIGATING APPARATUS.
APPLICATION FILED JUNE 30, 1908.
910,488.
Patented Jan. 26, 1909.
2 SHEETS—SHEET 2.
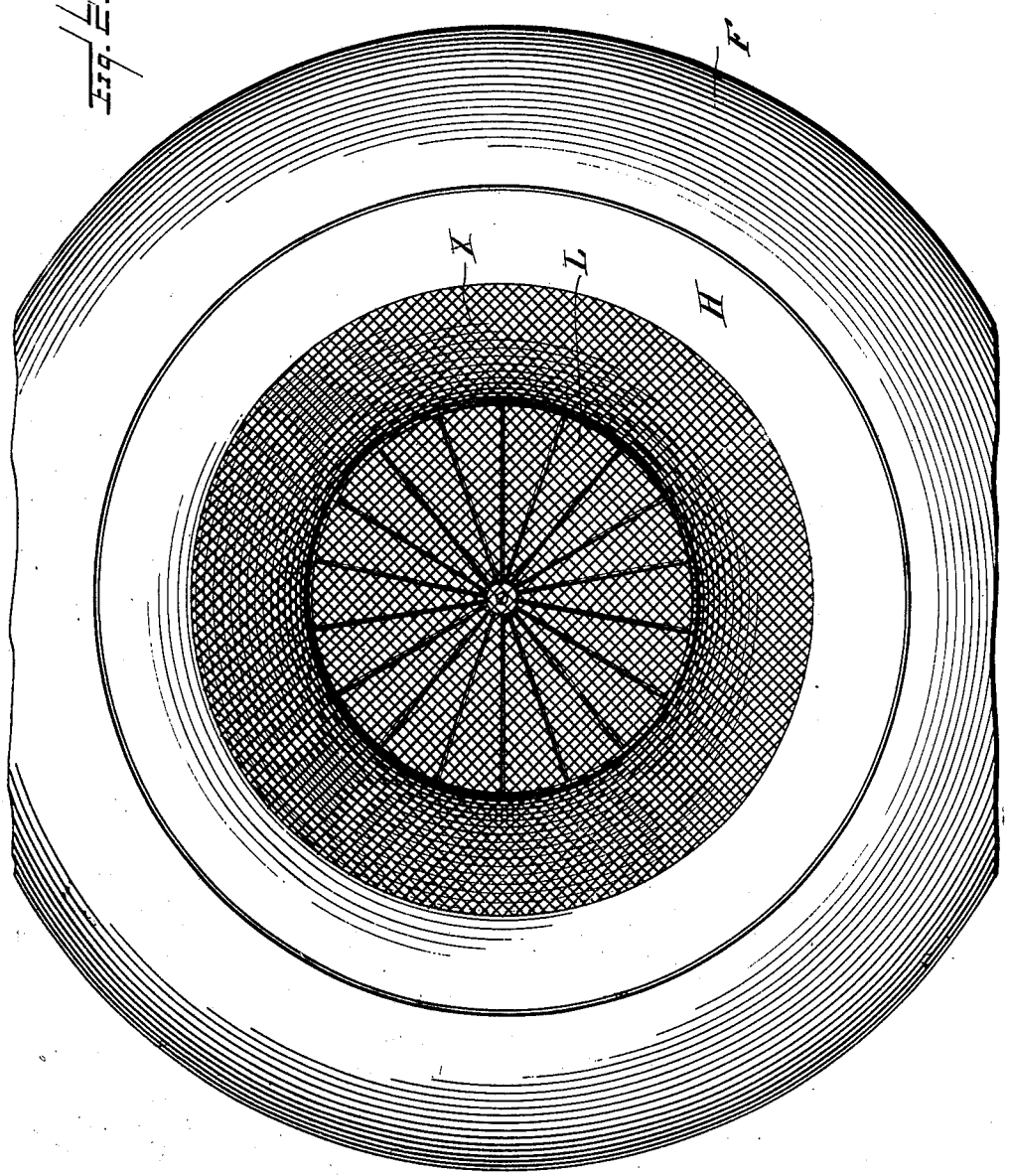

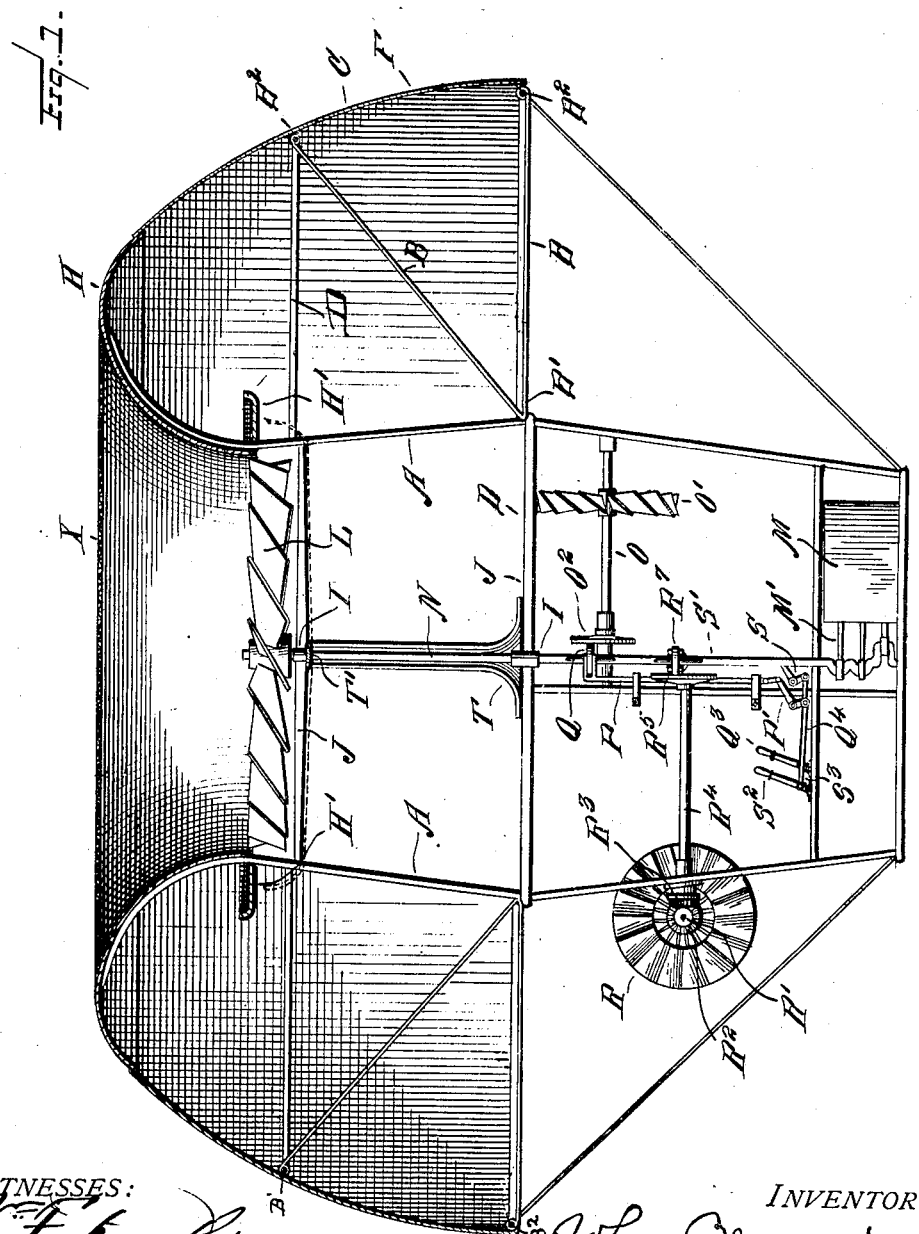

UNITED STATES PATENT OFFICE.

JOHN BERNARD, OF RICHMOND, VIRGINIA.

AERIAL NAVIGATING APPARATUS.

No. 910,488.　　　Specification of Letters Patent.　　Patented Jan. 26, 1909.

Application filed June 30, 1908. Serial No. 441,061.

*To all whom it may concern:*

Be it known that I, JOHN BERNARD, a citizen of the United States, residing at Richmond, in the county of Henrico and State of Virginia, have invented certain new and useful Improvements in Aerial Navigating Apparatus; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in aerial navigating apparatus and comprises essentially a combination aerial lifting and propelling mechanism and parachute.

The invention comprises various details of construction, combinations and arrangements of parts which will be hereinafter fully described and then specifically defined in the appended claims.

My invention is illustrated in the accompanying drawings, in which:—

Figure 1 is a vertical sectional view through the apparatus, and Fig. 2 is a top plan view.

Reference now being had to the details of the drawings by letter, A—A designate upright rods forming a portion of the frame of the apparatus and said rods may be made of bamboo, metal or any other suitable material.

B—B designate the rods forming the skeleton framework of the parachute C, said rods B being bent at an angle at B' and extending diagonally to the ring D, thus forming secure bracing means for the latter. When the rods B are made of metal, they are preferably bent to form the eyes B² through which ropes are adapted to be passed for fastening the canvas covering F to the rods B. In the event of bamboo or other light rods being substituted for the metallic rods B, eyes of any suitable material may be fastened thereto for the purpose of receiving cords which may be passed therethrough and to which rods any suitable covering, such as paper or canvas, may be secured. The upper portions of the rods A are bowed outwardly, and H designates a sheet, preferably of metal, to the under concaved surface of which said bowed portions of the rods A are securely fastened. The lower edge of said metallic sheet H has a concaved inwardly extending flange H' and its upper end is fastened to the upper ends of the rods A. The upper marginal edge of the canvas covering to said parachute is fastened in any suitable manner to the upper marginal edge of said metallic sheet H. Suitable bearing members I are mounted upon spiders J, the ends of which are fastened to the upright rods A, and N designates a vertically disposed shaft which is journaled in said bearings and to the upper end is fixed an aerial lifting wheel, designated by letter L, having blades of large area adapted to act as aeroplanes against the air as the wheel is rotated rapidly, the upper edges of the blades being preferably sharpened in order to offer as little resistance to the air as possible. Said wheel is of such a diameter as to substantially fill the opening in the top of the parachute, as shown clearly in Fig. 1 of the drawings.

A motor, designated by letter M, is supported by the frame of the apparatus having piston stems M' connected to cranks of the shaft N and affording means whereby the shaft may be rotated. Mounted horizontally in suitable bearings upon the upright rods A is a shaft O having a propelling wheel O' fixed thereto, and O² designates a friction disk fixed to the shaft O and adapted to be driven by a friction wheel Q which is splined to the shaft N and is moved into different positions by means of the bracket arm P, the lower end of which has pivotal link connection with an angle lever P' mounted upon the frame of the apparatus and to which angle lever an operating handle Q³ is pivotally connected through the medium of a link Q⁴.

A steering wheel, designated by letter R and similar in construction to the lifting wheel L, is mounted upon a shaft R' and has keyed thereto a beveled gear wheel R² in mesh with the beveled pinion R³ which is keyed to the shaft R⁴ and which latter is journaled in suitable bearings upon the rods A. The inner end of the shaft R⁴ has keyed or otherwise fixed thereto a friction disk wheel R⁵, and R⁷ designates a friction wheel which is splined to the shaft N. An angle lever S has one arm pivotally connected by means of the bracket arm S' to the friction wheel R⁷ and said lever S is rocked by the hand operated lever S² having a link S³ connecting the latter to said lever S.

An inner or auxiliary parachute, designated in the drawings by letter T, is provided for the purpose of closing the opening in the top of the parachute which surrounds the propeller L and said inner parachute is provided with a collar T' which is fastened about the upper bearing I in which the shaft N is journaled and is provided with radiating ribs which are fastened to said collar. When the inner or auxiliary parachute is opened out, its marginal edges will assume the positions shown in dotted lines in Fig. 1 of the drawings, in which position the outer ends of the ribs which are slightly concaved or upwardly curved will come in contact with the inwardly concaved end of the metallic sheet H, thus offering a secure resistance thereto.

In operation, when a rotary movement is imparted to lifting wheel L, a partial vacuum is formed above the wheel, causing air to be drawn through the opening in the top of the parachute and driven laterally into the interior of the parachute F, causing the air to be compressed and retained therein, thereby making a more dense medium for the blades to work upon thus expediting the pulling force in the upward movement of the apparatus. As the wheel L is driven rapidly and the blades thereof being of considerable area, they will act as aeroplanes and their upper edges being sharpened will readily cut the air with little resistance. The tendency of the rapid rotary movement of the wheel L would be to cause the apparatus to rotate in the air as it ascends and, to overcome this, the wheel R being driven in a direction opposite to the natural tendency of the apparatus will have the effect to hold the latter from rotation as it rises in the air under the propulsive power of the driven wheel L. In order to hold the apparatus in its proper position for making ascensions, the center of gravity of the apparatus should be in the lower part of the frame as it naturally would be where the engine and operator are located.

In the event of the machinery stopping for any purpose while the apparatus is in the air and in order to assure a gradual descent of the machine, the inner or auxiliary parachute would automatically open and assume the position shown in dotted lines in Fig. 1 of the drawings, thus closing the opening in which the lifting wheel L is mounted, thus affording a large area of resistance to the air as the apparatus gently descends. In order to reinforce and strengthen the upper portion of the sheeting H and to prevent objects being drawn through the opening in the parachute incident to the pulling force of the wheel L as it rotates, I provide a metallic or other netting, designated by letter X, the marginal edge of which is fastened to the upper portion of the sheeting as shown clearly in the drawings.

While I have shown a particular form of lifting wheel, comprising aeroplane blades which rotate, if desired a positive blower may be substituted therefor.

What I claim to be new is:—

1. A combination aerial navigating apparatus and parachute, comprising a framework, a parachute having a central opening, a driving wheel positioned therein, an auxiliary parachute mounted upon the shaft of said wheel and having ribs, the ends of which are concaved and adapted, when opened out, to engage under the marginal edge of said opening in the parachute, as set forth.

2. A combination aerial navigating apparatus and parachute, comprising a framework, a parachute having a central opening, a driving wheel positioned therein, an auxiliary parachute mounted upon the shaft of said wheel and having ribs, the ends of which are concaved and adapted, when opened out, to engage under the marginal edge of said opening in the parachute, a flaring metallic plate about the margin of said opening and extending over the top of the parachute, as set forth.

3. A combination aerial navigating apparatus and parachute, comprising a framework, a parachute having a central opening, a driving wheel positioned therein, an auxiliary parachute mounted upon the shaft of said wheel and having ribs, the ends of which are concaved and adapted, when opened out, to engage under the marginal edge of said opening in the parachute, a flaring metallic plate about the margin of said opening and having an inwardly extending flange, the outer portion of said plate extending over the top of the parachute, as shown and described.

In testimony whereof I hereunto affix my signature in the presence of two witnesses.

JOHN BERNARD.

Witnesses:
   FRANKLIN H. HOYT,
   A. L. HOUGH.